Jan. 21, 1969  MASUMI KATO  3,422,480
WINDSHIELD WIPER APPARATUS
Filed Nov. 30, 1967

INVENTOR
Masumi Kato
BY Cushman, Darby & Cushman
ATTORNEYS

United States Patent Office 3,422,480
Patented Jan. 21, 1969

3,422,480
WINDSHIELD WIPER APPARATUS
Masumi Kato, Aichi-ken, Japan, assignor to Nippon Denso Company Limited, Kariya-shi, Japan, a corporation of Japan
Filed Nov. 30, 1967, Ser. No. 686,866
Claims priority, application Japan, Dec. 2, 1966, 41/79,110
U.S. Cl. 15—250.21    3 Claims
Int. Cl. A47l *1/03;* B60s *1/32;* B60s *1/36*

ABSTRACT OF THE DISCLOSURE

A windshield wiper apparatus having a wiper arm pivotally connected at a point to an oscillation lever and at another point to a rotary crank arm or to a slide member slidable on a rotary crank arm and guided by a cam groove whereby the wiper blade fixed to the foremost end of the wiper arm is moved along a loop-shaped path to wiper a quasi-rectangular area on the windshield upon rotation of the crank arm.

BACKGROUND OF THE INVENTION

The present invention relates generally to windshield wiper apparatus for use in vehicle and particularly to a mechanism for causing the wiper blade to wipe the windshield in rainy weather.

Conventional device of this kind is of such an arrangement that the blade of rubber material reciprocates along the same arcuate path on rectangular windshield surface to effect wiping operation within a fan-shaped range, so that there is left a greater area which is not wiped off by the blade. This affects adversely a safety operation of vehicle.

There is another type of conventional wiper apparatus wherein a relatively longer blade is used for up and down or left and right wiping operation. However, this type of wiper apparatus is required to have a blade of substantial strength, guide rails of considerable length, high power motor, etc. and is not practical in respect of its cost.

Furthermore, the conventional devices of this kind are inevitably subjected to impact loads and generate noises at the opposite ends of the wiping movement. This is due to the fact that the conventional devices are designed to reciprocate along the same path and turn over at the opposite ends of the wiping movement. Such noises greatly irritate an operator in his nerve especially during a high-speed operation or an operation under small load.

SUMMARY OF THE INVENTION

The present invention is to solve all of the above-mentioned shortcomings or drawbacks and a primary object of the invention is to provide a windshield wiper apparatus which is operable to wipe a wider area of quasi-rectangular shape on the windshield surface, while utilizing wiper blades of conventional type.

Another object of the present invention is to provide a windshield wiper apparatus which operates with less noise generated at the turn-over points of the blades.

Still another object of the invention is to provide a windshield wiper apparatus for use in a vehicle wherein the wiper blade produces wiped areas different in the forward and the backward wiping movements thereof and wherein the lower end of the blade describes a loop.

A further object of the invention is to provide a windshield wiper apparatus for use in a vehicle comprising a crank arm connected to a driving shaft and adapted to be rotated thereby, a wiper arm pivotally connected at one end to said crank arm and having a wiper blade fixedly mounted thereon at the other end thereof, an oscillation lever pivotally connected at one end to said wiper arm at a point between the opposite ends thereof and also pivotally connected at a point near the other end to the body of said vehicle whereby said blade, upon rotation of said crank arm, is driven to move in such a manner that the ends of said blade describe loops on the surface of the windshield.

A still further object of the invention is to provide a windshield wiper apparatus for use in a vehicle comprising a crank arm connected to a driving shaft and adapted to be driven thereby, a slide member slidably mounted on said crank arm, a wiper arm pivotally connected at one end to said slide member and having a wiper blade fixedly mounted thereon at the other end thereof, an oscillation lever pivotally connected at one end to said wiper arm at a point between the opposite ends thereof and also pivotally connected to the body of said vehicle, a plate having therein a cam groove of a predetermined shape of loop, said slide member having a pin positioned within said cam groove and adapted to be guided thereby, whereby, said blade, upon rotation of said crank arm, is driven to move in such a manner that the ends of said blade describe loops on the surface of the windshield.

The above and other objects and features of the present invention will be made apparent from the following description with reference to the accompanying drawings.

Figure 1:
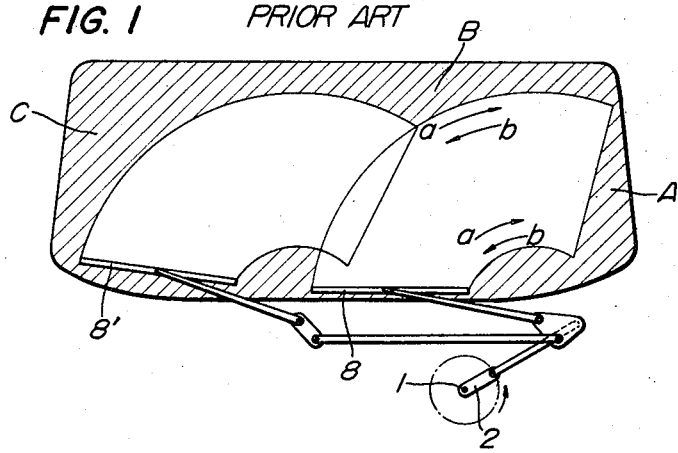
FIG. 1 diagrammatically illustrates the operation of a typical example of conventional wiper apparatus, FIG. 2 diagrammatically illustrates a wiper apparatus and its operation according to an embodiment of the present invention.

First, reference is made to FIG. 1 which shows the operation of the conventional wiper apparatus. Numeral 1 indicates a driving shaft on which a crank arm 2 is fixedly mounted. The rotation of the crank arm 2 causes the link rods shown to reciprocate in the direction as shown by arrows *a* and *b* for obtaining wiped areas of fan-shape on the windshield. With the conventional wiper devices, therefore, there are left uncleaned areas A, B and C as shown by hatchings. This difficulty cannot be improved or solved even by shifting the pivotal axes of the wiper arms to displace fan-shaped wiping areas rightward or leftward.

The uncleaned area A obstructs an operator's view of a front mirror. In order to solve this difficulty, an attempt has been made to change the angle of a wiper blade with respect to the wiper arm so that, when the blade is moved to the rightmost point of the reciprocating movement, one end (lower end) of the wiper blade wipes the lower corner area which corresponds to the area A in FIG. 1. The result, however, is the fact that, when the blade is moved to the leftmost point of the reciprocating movement, only the other end (upper end) of the blade reaches the lower edge of the windshield with said one end being left or positioned at a point adjacent the central portion of the right half of the windshield. Therefore, a triangular uncleaned surface area is left at the lower portion of the intermediate region of the windshield. Furthermore, said one end which is positioned centrally of the right half of the windshield obstructs the operator's sight even during the operation in a fine weather.

On the other hand, if the pivotal axis of the wiper arm of right hand is positioned at a point which is outwardly or rightwardly shifted from its normal or original location and if the blade is caused to operate within reduced angles of wiping range so as not to leave an uncleaned area A in front of the operator, uncleaned surface of a larger area is left at the portion above the region where the wiping areas of the blades 8 and 8' overlap, that is, at the upper portion of the intermediate zone of the windshield.

Furthermore, if the pivotal axis of the wiper arm of left hand is positioned at a point which is shifted from its original location by a distance corresponding to that by which the pivotal point of the right hand wiper arm has been shifted, an increased area of uncleaned surface is left at region C.

Moreover, if an arrangement that the blades 8 and 8' are moved with parallel relationship being held between both blades, is changed to an arrangement that the blades are reciprocated in symmetrical fashion, there is left a wider uncleaned area B at the upper portion of the intermediate zone of the windshield.

It will, therefore, be appreciated that, with the conventional wiper apparatus which is adapted to wipe fanshaped areas, it is inevitable to produce uncleaned surface portions as shown in FIG. 1.

DESCRIPTION OF THE PREFERRED EMBODIMENTS

Figure 2:
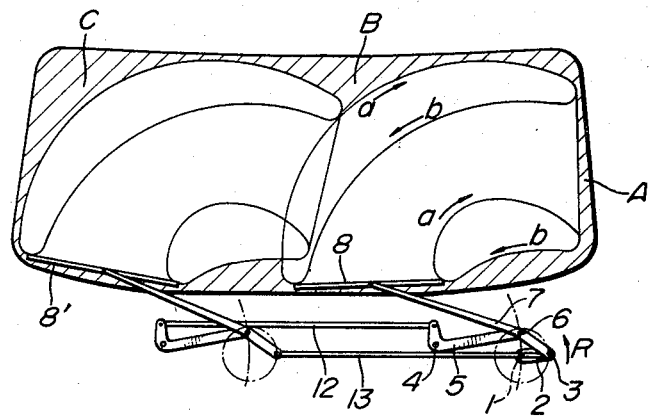
Figure 3:
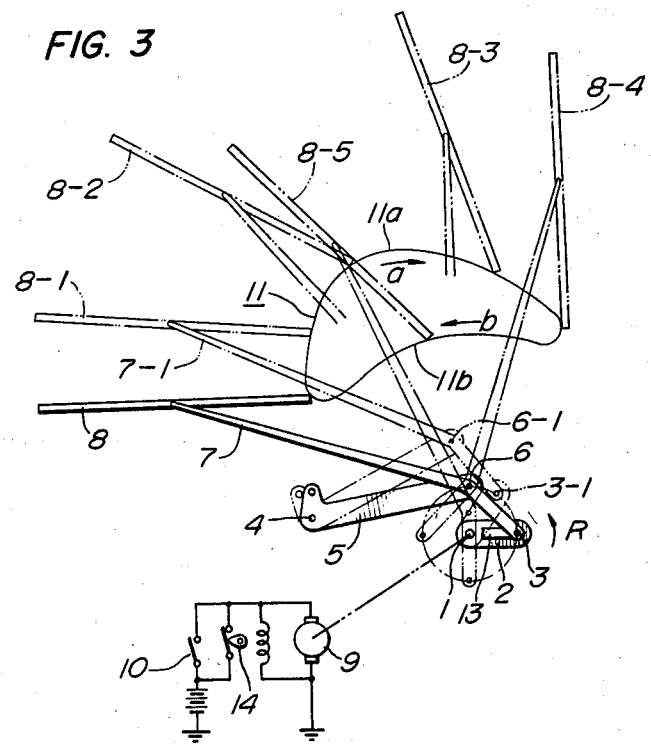
FIG. 3 shows in detail the operation of the link motion shown in FIG. 2, and FIG. 4 diagrammatically illustrates a wiper apparatus and its operation according to a modified embodiment of the present invention, with the left hand blade and supporting structure being omitted for simplification purpose of the drawings.

Next, an embodiment of the present invention will be described with reference to FIGS. 2 and 3. Numeral 1 indicates a driving shaft to which is fixedly connected a crank arm 2 having a pin 3 at its outer end. A wiper arm 7 is pivotally connected at one end to the pin 3 and has a wiper blade 8 rigidly fixed to the other end thereof. A pin 4 is mounted on the body of a vehicle and provides a pivotal axis for an oscillation lever 5. At the outer end of the lever 5 is mounted a pin 6 by means of which the lever 5 and the wiper arm 7 are pivotally connected.

Link rods 12 and 13 pivotally connect the other end of the oscillation lever 5 and the pivot pin 3 to corresponding parts in the mechanism for another wiper blade 8' so that both blades 8 and 8' are moved in synchronized relation and in the same manner.

The driving shaft 1 is connected to a wiper motor 9 through an appropriate speed reduction mechanism. Numeral 10 indicates a switch for the wiper motor. By the use of a cam 14 of conventional type that is housed in a motor to automatically stop the motor in a predetermined position shown by full line. The above-mentioned structural elements are so dimensioned and arranged that, when the motor 9 is stopped, the elements take their positions as shown by full line.

Now a description will be made of the operation of the above described apparatus of the present invention by referring mainly to FIG. 3.

When the switch 10 is closed so as to operate the wiper apparatus, the wiper motor 9 is rotated and the crank arm 2 connected to the motor shaft through the speed reduction mechanism is initiated to rotate in the direction shown by an arrow R. When the crank arm has been rotated for 60 degrees, the pin 3 is in a position 3–1. Since the pin 6 is mounted on the lever 5 which oscillates about the pin 4 as described in the above, the pin 6, upon rotation of the crank arm 2, is moved about the pin 4 to a position 6–1 along the circular path of the radius which is equal to the distance between the pins 4 and 6. At this position of the lever 5, the wiper arm 7 has been moved to a position shown in phantom line at 7–1 and, accordingly, the blade 8 has been substantially vertically lifted to a position 8–1 and has swept the area up to this position.

Similarly, in case the crank arm 2 is rotated for 90 degrees, the blade 8 may sweep or wipe the windshield up to a position 8–2. When the crank arm 2 is further rotated to a position which is remote from its original or initial position by 150 degrees, the blade is moved to a position 8–3, and if the crank arm is moreover rotated to a 180 degree position, the blade is in a position 8–4 and the area up to this position is wiped off.

A line 11a represents a locus described by the lower end of the blade 8 during the forward movement which has been carried out in the direction as shown by an arrow a.

When the crank arm 2 is rotated further, the pin 3 is downwardly moved, in other words, the pivotal connection of the wiper arm 7 to the crank arm 2 is moved downwardly, and the lower end of the blade 8 is moved in the direction shown by an arrow b toward the initial position along a path different from the one along which the forward movement of the blade has been effected and when the crank arm is in a position which is remote from the initial position by 270 degrees, the blade 8 is in a position 8–5 and, after one complete revolution of the crank arm, the blade is returned to its rest position.

Thus, the lower end of the blade 8 during the second half or backward movement describes a line 11b and, accordingly, the lines 11a and 11b are combined into a complete loop 11.

The aforesaid wiping or sweeping operation is continued until the switch 10 is opened.

As described in the above, the blade is moved along a path of a predetermined loop-shape, or in other words, the blade is moved along different paths in the first and the second halves of the wiping movement in every revolution of the crank arm, and this fact enables the blade to produce a wiped or cleaned area of quasi-fan-shape during one half of one reciprocation and produce a wiped area of different quasi-fan-shape during the other half of the reciprocation. Both quasi-fan-shaped areas, when combined or united together, form a quasi-rectangular region which may cover the substantial parts of an area corresponding to the area A as has been left uncleaned with the conventional device. Also, the blade operated according to the apparatus of the present invention leaves only a narrower uncleaned area in the portion C due to the fact that the blade is substantially vertically lifted in the initial stage of the forward movement thereof. It will, therefore, be appreciated that the windshield wiper apparatus of the present invention produces a wiped area wider or greater than that obtainable from the conventional wiper apparatus which utilizes the wiper blades of the same length as the blades used in the apparatus of the present invention.

One more advantageous feature of the apparatus of the present invention is that the blades are not merely turned over at the opposite ends of the wiping movements as in the conventional apparatus but, instead, describe loops and, accordingly, the wiper blades operated according to the present invention are subjected to a highly reduced amount of impact load and, thus, produce noise of greatly reduced volume.

Figure 4:
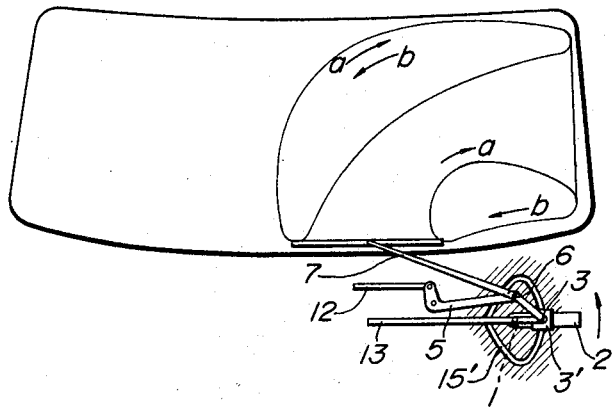

Next, a description will be made of a modified embodiment of the present invention as shown in FIG. 4. In this figure, a same referential numeral as in the aforesaid embodiment is to represent or indicate the same or equivalent element to the one in the preceding embodiment.

A driving shaft 1 is adapted to drive or rotate a crank arm 2 on which a slide member 3' is slidably mounted. A pin 3 is mounted on the slide member. On the other hand, there is provided a plate 15 having therein a cam groove 15'. The pin 3 of the slide member is positioned within the cam broove 15'. The remaining arrangement is the same as in the preceding embodiment. Therefore, when the shaft 1 is rotated together with the crank arm 2, the pin 3 on the slide member 3' is guided by the cam groove 15' whereby the blade 8 is caused to describe a loop according to the same principle of operation as that in the aforestated embodiment.

This embodiment is advantageous in that a desired configuration of cam groove may be utilized for causing the blade to wipe a desired range on the windshield surface and, in this manner, one can obtain a wiping area greater or wider than that obtainable from the apparatus according to preceding embodiment.

The invention has been disclosed by reference to the details of preferred embodiments, but such disclosure is intended to be illustrative, rather than limiting, and other embodiments and modifications will readily occur to those skilled in the art within the scope of the appended claims.

What is claimed is:

1. A windshield wiper apparatus for use in a vehicle comprising a crank arm connected to a driving shaft and adapted to be rotated thereby, a wiper arm pivotally connected at one end to said crank arm and having a wiper blade fixedly mounted thereon at the other end thereof, an oscillation lever pivotally connected at one end to said wiper arm at a point between the opposite ends thereof and also pivotally connected at a point near the other end to the body of said vehicle whereby said blade, upon rotation of said crank arm, is driven to move in such a manner that the ends of said blade describe loops on the surface of the windshield.

2. A windshield wiper apparatus according to claim 1 further comprising a second wiper arm having one end linked to said one end of said first wiper arm through a link rod and having a second wiper blade fixedly mounted thereon at the other end of said second wiper arm, a second oscillation lever connecter to said second wiper arm at a point between the opposite ends thereof and also pivotally connected to said vehicle body at a point near the other end, said other end of said oscillation lever being linked through another link rod to said the other end of said first oscillation lever, whereby said second wiper blade is operated in synchronized relation and in the same manner as the first wiper blade.

3. A windshield wiper apparatus for use in a vehicle comprising a crank arm connected to a driving shaft and adapted to be driven thereby, a slide member slidably mounted on said crank arm, a wiper arm pivotally connected at one end to said slide member and having a wiper blade fixedly mounted thereon at the other end thereof, an oscillation lever pivotally connected at one end to said wiper arm at a point between the opposite ends thereof and also pivotally connected to the body of said vehicle, a plate having therein a cam groove of a predetermined shape of loop, said slide member having a pin positioned in said cam groove and adapted to be guided thereby, whereby, upon rotation of said crank arm, said blade is driven to move in such a manner that the ends of said blade describe loops on the surface of the windshield.

References Cited

UNITED STATES PATENTS 762,889  6/1904  Douglass _____ 15—250.32 XR

FOREIGN PATENTS 491,441  3/1953  Canada.
1,162,324  4/1958  France.

PETER FELDMAN, *Primary Examiner.*

U.S. Cl. X.R.

15—250.27, 250.3, 250.34; 74—70